United States Patent [19]

Eccardt et al.

[11] Patent Number: 5,761,155
[45] Date of Patent: Jun. 2, 1998

[54] METHOD FOR DETERMINING THE POSITION OF AN OBJECT RELATIVE TO THE BACKGROUND WITH ULTRASOUND

[75] Inventors: Peter-Christian Eccardt, Ottobrunn; Nils Krömer, Hohenstein-Ernstthal; Stefan Lechner; Valentin Magori, both of München; Martin Vossiek, Hamm, all of Germany

[73] Assignee: Siemens Aktiengesellschaft, Munich, Germany

[21] Appl. No.: 687,367

[22] PCT Filed: Feb. 28, 1995

[86] PCT No.: PCT/DE95/00254

§ 371 Date: Aug. 2, 1996

§ 102(e) Date: Aug. 2, 1996

[87] PCT Pub. No.: WO95/23344

PCT Pub. Date: Aug. 31, 1995

[30] Foreign Application Priority Data

Feb. 28, 1994 [DE] Germany ............ 44 06 525.6

[51] Int. Cl.⁶ .................................................. G01S 7/52
[52] U.S. Cl. .............................. 367/99; 367/87; 367/98
[58] Field of Search ........................... 367/87, 95, 99, 367/908, 98; 73/290 V

[56] References Cited

U.S. PATENT DOCUMENTS

| | | | |
|---|---|---|---|
| 3,184,969 | 5/1965 | Boiton | 73/290 V |
| 4,868,797 | 9/1989 | Soltz | 367/98 |
| 5,157,639 | 10/1992 | Leszczynski | 367/99 |
| 5,587,969 | 12/1996 | Kroemer et al. | 367/99 |

FOREIGN PATENT DOCUMENTS

| | | |
|---|---|---|
| 0 146 829 A2 | 7/1985 | European Pat. Off. . |
| 30 36 501 A1 | 5/1982 | Germany . |
| 38 11 479 A1 | 10/1989 | Germany . |
| 39 06 627 A1 | 9/1990 | Germany . |
| WO94/11753 | 5/1994 | WIPO . |

OTHER PUBLICATIONS

Technisches Messen tm. 55 Jahrgang. Heft Oct. 1988—Ultraschall–Systeme fur die industrielle Objekterfassung J 099–16 pp. 367–376.

*Primary Examiner*—Ian J. Lobo
*Attorney, Agent, or Firm*—Hill, Steadman & Simpson

[57] ABSTRACT

In a method for determining the position of an object relative to the background with ultrasound, a plurality of ultrasound transducers arranged in a row simultaneously transmit ultrasound in line-shaped fashion in the direction of an object scene and receive both the echo of the signal transmitted by the transducer itself as well as the echoes of the signals generated by the neighboring ultrasound transducers. On the basis of a reference measurement wherein no object is located in the measurement region, the amplitudes and the times of incidence of the echo signals are stored. In the following measurements with an object, the echo amplitudes and the times of incidence of the echo signals are again stored and compared by fuzzy logic to those of the reference measurement. As a result, this supplies the position of the object relative to the background.

14 Claims, 6 Drawing Sheets yz-PLANE xz-PLANE

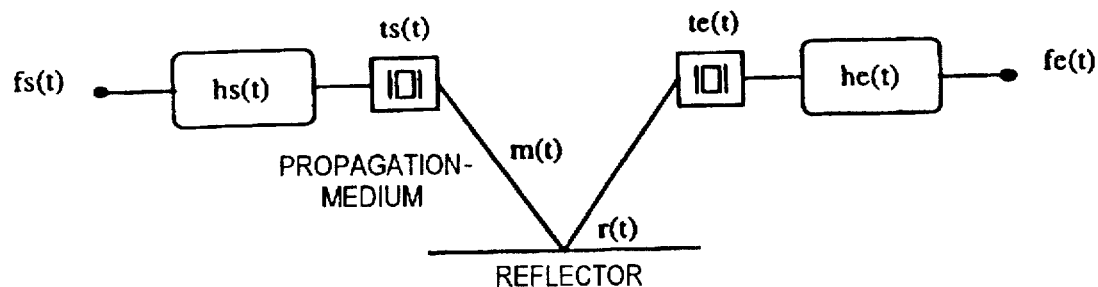
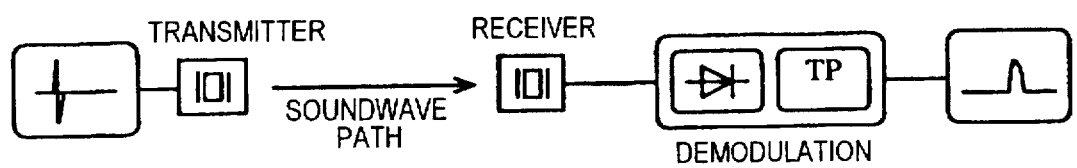
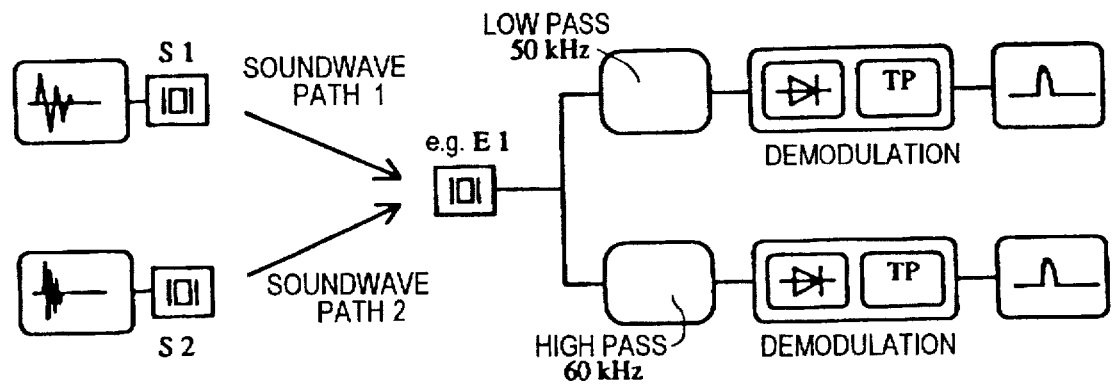

FIG 12a
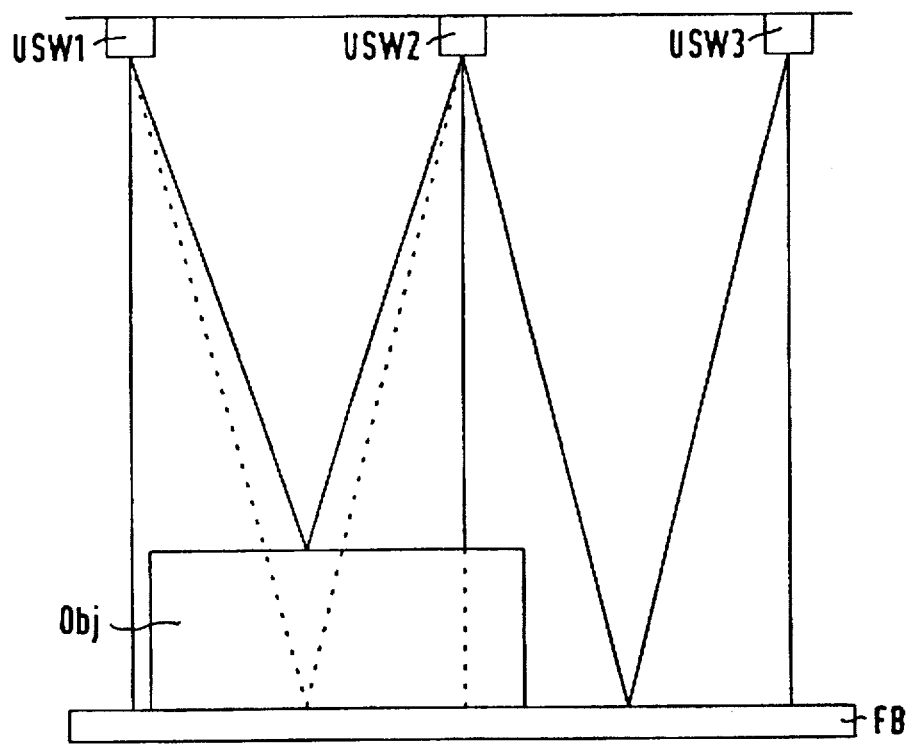
FIG 12b  FIG 12c  FIG 12d  FIG 12e  FIG 12f
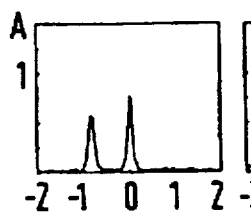 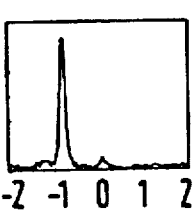 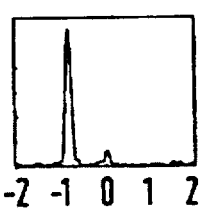 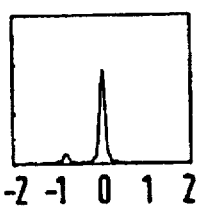 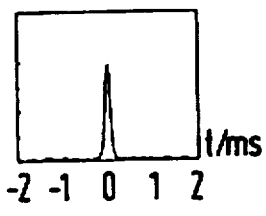

METHOD FOR DETERMINING THE POSITION OF AN OBJECT RELATIVE TO THE BACKGROUND WITH ULTRASOUND

BACKGROUND OF THE INVENTION

P 42 38 262.9 discloses an object recognition system that works with a transmission and a reception ultrasound transducer. An individual ultrasound transducer emits an ultrasound signal in the direction of the object scene. The signal reflected thereat, the echo, contains the determining information of the structure of the object scene. The echo signal is in turn received by a single ultrasound transducer. The transducer principle employed is a matter of a directional sharp ultrasound transducer. The disadvantages of this arrangement and of the signal evaluation method deriving therefrom lie in the low sampling of the measuring system, as well as in the difficulty of evaluating a large object scene area in large-area fashion and in the low lateral resolution.

SUMMARY OF THE INVENTION

An object of the invention is to specify a method with which the position of an object relative to the background can be identified.

According to the method of the invention for determining a position of an object relative to a background with ultrasound, an ultrasound reference signal is emitted in a direction of the background where the reference signal is reflected. An amplitude and an occurrence time of a maximum of the reflected reference signal are stored. An ultrasound measurement signal is emitted in the direction of the object and of the background where the measurement signal is reflected. If a maximum occurs in the reflected measurement signal at the occurrence time of the maximum of said reflected reference signal, the amplitude of the maximum of the reflected measurement signal is stored. A first coverage degree is determined from the amplitude of the maximum of the reflected reference signal and the amplitude of the maximum of the reflected measurement signal, the first coverage degree being a criterion for a coverage of the background by the object and a criterion for a position of the object since the coverage of the background is greater the smaller the amplitude of the maximum of the reflected measurement signal is compared to the amplitude of the maximum of the reflected reference signal.

An advantage of the invention is the enhanced measuring precision.

The object contour is also detectable with the invention.

The entire width to be measured can be acquired in one step with the invention.

The invention makes it possible to increase the measuring rate.

It is also advantageous that the method of the invention can be simply adapted to many different types of available transducers.

The invention shall be explained in greater detail with reference to the FIGS.

BRIEF DESCRIPTION OF THE DRAWINGS

FIG. 6 shows the transmission link of the system;

FIG. 7 illustrates the procedure of transmitting and receiving an ultrasound signal given sequential transmission and reception;

FIG. 8 shows the procedure of sending and receiving an ultrasound signal on two frequency bands;

FIG. 12a is a measuring situation wherein all types of reflection occur and 12b–f, the corresponding result functions;

DESCRIPTION OF THE PREFERRED EMBODIMENTS

Figure 1:
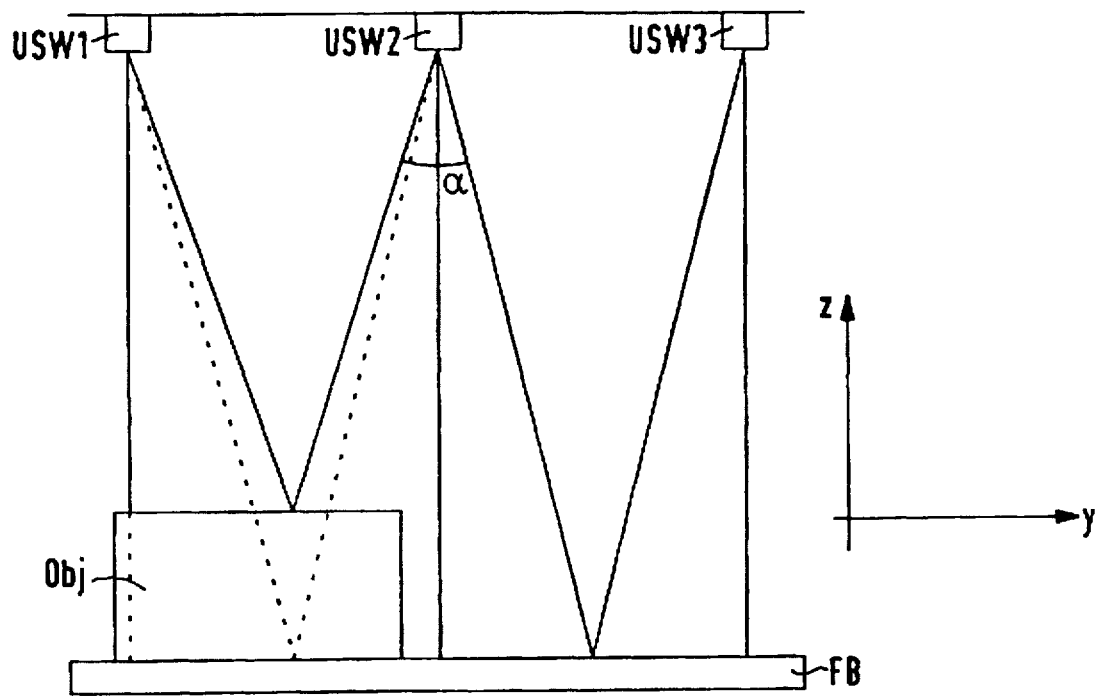
FIG. 1 shows the measurement format in a section transverse to the moving direction of the conveyor belt.

The structure of the measurement system is schematically shown in FIG. 1. Three ultrasound transducers USW1, USW2, USW3 are attached at a height of 80 cm above the 60 cm wide conveyor belt FB transversely spaced 26 cm from one another. Given the ultrasound transducers employed, whose pulse response and spectrum is [sic] shown in FIG. 2, what are involved are PVDF film transducers as described by W. Manthey, N. Kroeiner, V. Magori, "Ultrasonic Transducers and Transducer Arrays for Application in Air", Meas. Sci., Technol., Vol. 3(3), pp. 249–261, March 1992. Their center frequency lies at approximately 60 kHz. The 3 dB bandwidth amounts to approximately 15 kHz. The emission direction of the ultrasound transducers USW1, USW2, USW3 is aligned perpendicular to the surface of the conveyor belt.

The control of the measuring sequence and the signal processing is assumed by a microprocessor. A signal generator excites the ultrasound transducers USW1, USW2, USW3 with freely programmable signals. After a signal pre-processing, for example an amplification or filtering, the reception signals are transmitted in digitized fashion to the processor for further evaluation. The output of the results occurs via a defined interface.

Structure of the Measuring System, Measuring Situation and Arrangement of the Ultrasound Transducers In order to obtain predictive measured signals with few transducers, particular significance is accorded to the arrangement of the sensors.

Since the objects Obj (articles) are moved on the conveyor belt FB, the entire object need not be acquired at once; rather, it is adequate to acquire the object dimensions, to measure a narrow strip repeatedly transversely relative to the conveying direction while the object Obj continues to be transported. A plurality of lateral height profiles of the object Obj are thus to be identified. The position in the belt running direction can also be identified in this way with the height profiles via measurements at uniform, optimally short time intervals and, thus, a relative exact image of the object on the conveyor belt can be reconstructed.

In order to obtain signals from the ultrasound transducers suitable for the determination of the height profile, a plurality of transducers USW1, USW2 and USW3 are arranged in a row above the conveyor belt FB at uniform spacings transversely relative to the conveying direction. The principal emission direction of the ultrasound transducers thereby point perpendicularly onto the conveyor belt FB.

FIG. 1 shows a section transversely relative to the conveying direction. The part of the ultrasound wave that impinges perpendicularly onto the background—in the following, also referred to as conveyor belt FB or background—is reflected back to the transmitter. So that too many ultrasound transducers need not be employed, the sound paths from one transducer to the neighboring transducer should also be taken into account in the evaluation. The ultrasound transducers should therefore have a large emission angle $\alpha$ transversely relative to the moving direction of the conveyor belt FB so that the reflected waves likewise arrive at the neighboring receiver with adequate amplitude. When an object Obj lies under the transducers USW1, USW2 and USW3, then a part of the acoustic wave is no longer reflected from the background but from the object Obj. The height profile of the object Obj is to be identified by comparing the measured signals to the reference signals (when no object lies in the measuring area).

In the implemented tests, work was carried out with an arrangement of three ultrasound transducers USW1, USW2, USW3 that are attached at a height of 80 cm over the background spaced 26 cm from one another. A width of 60 cm can be covered with this arrangement.

Ultrasound Transducer

Figure 2:
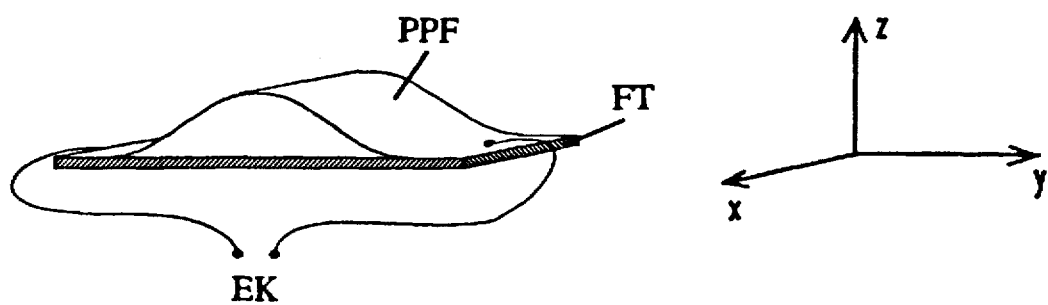
FIG. 2 illustrates the structure of an ultrasound transducer composed of piezopolymer film.

Transducers of piezopolymer films PPF are used as ultrasound transducers; also see FIG. 2. Transducers having a large transmission bandwidth can be cost-beneficially manufactured with this technology. The directional characteristic can also be very well adapted to the desired situation. Due to their relatively good impedance matching to gaseous agents, piezoelectric polymer films are excellently suited for ultrasound application in air.

In the measuring system presented herein, ultrasound transducers having a resonant frequency of 60 kHz are employed. The structure of one of the transducers employed is shown in FIG. 2. A piezopolymer film PEF is applied onto a planar film carrier FT. An expanded polyurethane tape sticky on both sides serves as film carrier FT. In addition to its acoustically damping properties, it offers the advantage that the film need merely be glued onto the film carrier FT for lateral fixing. A piezopolymer polyvinylidene fluoride can be employed as the film material. A hat-shaped geometry for the resonant film derives from the type of fastening applied here. The film has a convex arch in the middle that merges into a concave arch in the region of the fastening. The properties of the transducer, for example resonant frequency and directional characteristics, are determined via the geometry of the film arching, i.e. essentially via the height and width thereof. The contacting of the piezopolymer film PPF metallized on both sides occurs with bond wires EK that are applied with silver conductive adhesive.

The transducer can be operated both as transmitter as well as receiver of ultrasound signals.

Figure 3:
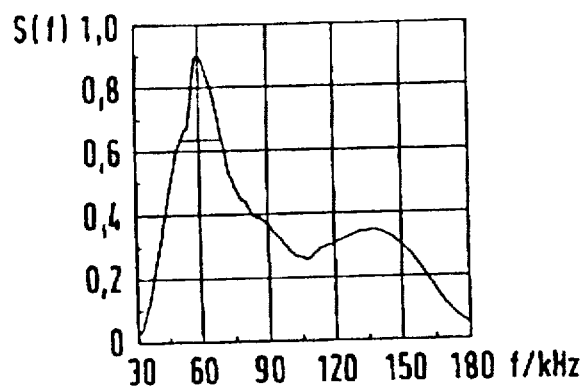
FIG. 3 shows the frequency response of an ultrasound transducer as shown in FIG. 3.

The most important properties of the transducers employed shall be described in brief below. The frequency response of the transducer in the transmission mode may be seen in FIG. 3. The resonant frequency of the ultrasound transducer lies at 60 kHz; and the 3 dB bandwidths amount to 16 kHz. The frequency response during reception has a similar curve in the relevant region around the resonant frequency.

Figure 4:
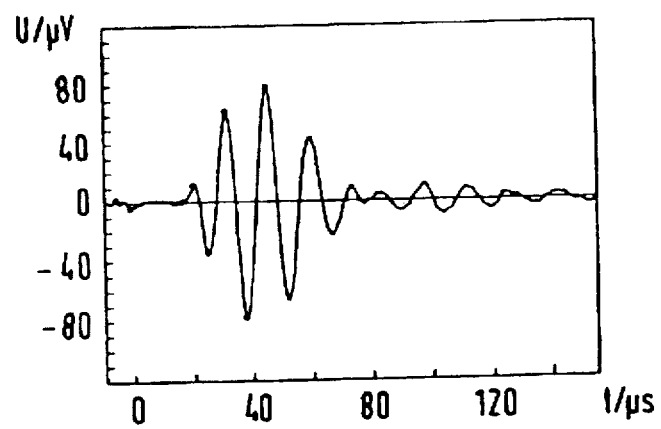
FIG. 4 shows the pulse response of an ultrasound transducer as shown in FIG. 3.

FIG. 4 shows the pulse response of the transducer in alternating transmission/reception operation with reflection at a planar surface.

Figure 5A:
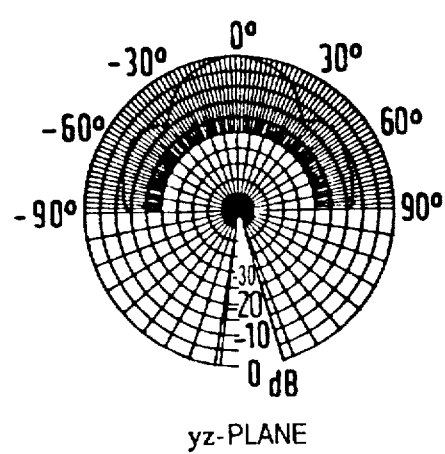
FIG. 5a is the curve of the ultrasound signal amplitude of an ultrasound transducer as shown in FIG. 3, in the yz-plane.
Figure 5B:
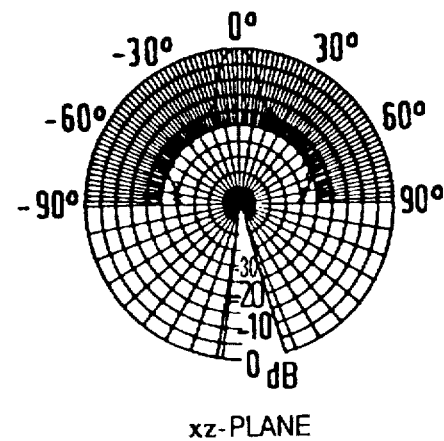
FIG. 5b is the curve of the ultrasound signal amplitude of an ultrasound transducer as shown in FIG. 3, in the xz-plane.

The curve exhibits a relatively broad maximum around the principal emission direction in the yz-plane—see FIG. 5a—whereas the lobe in the xz-plane—FIG. 5b—is significantly narrower. The 3 dB emission angle in the yz-plane amounts to 35° for the resonant frequency and amounts to 10° in the xz-plane. The directional characteristic is frequency dependent.

Overall Measuring Arrangement

Three ultrasound transducers USW1, USW2 and USW3 may be seen over the conveyor belt FB in FIG. 1. A transmission output stage and a reception pre-amplifier is present for each transducer. The excitation of the ultrasound transducers USW1, USW2 and USW3 and the evaluation of the reception signals occurs with a processor. It calculates the transmission signals and their frequency modulation and outputs the calculated signals to the transmission output stages. The ultrasound transducers USW1, USW2, USW3 generate corresponding ultrasound signals that return from the object scene and are in turn captured by the transducers. In order to have a time reference for the beginning of the registration, the processor generates a trigger pulse at the beginning of the transmission event. The reception signals pending at the input side at an A/D transducer are forwarded in digitized fashion to the processor for signal processing.

In order to be able to identify a complete height profile of the object Obj, information must be present over the entire width of the measurement strip, i.e. all transducers must output a transmission signal whose reflections are interpreted. Given transducers driven with identical transmission signals, all transducers cannot transmit simultaneously since each receiver registers an aggregate signal from the reflected parts of the individual transmitters in this case and an allocation can no longer be made as to what signal parts derive from what transmitter. Various methods for controlling the measuring sequence are therefore applied dependent on the time demand made of the resolution.

When a static -measurement is to be undertaken or when an object moving very slowly is to be measured, then it is adequate to individually successively excite each transmitter. In order to cover rapidly moving objects, other methods are to be applied that allow the entire situation to be acquired line-by-line in parallel in a few cycles. For that purpose, the transmission signals must be encoded in order to be able to in turn separate the parts at the receiver. The coding, for example, can occur by division onto different frequency bands. The separation at the receiver occurs filtering or by correlation with a reference signal.

The fundamental goal in all methods is to obtain a result for each possible acoustic path and from which the running time and the intensity of the reflected signal can be identified. An optimally short pulse should be obtained as result, since the pulse width directly determines the topical resolution of the system.

The sequential excitation of the ultrasound transducers is the simplest method for this sensor system and the one that can be realized with the lowest expense for hardware and software.

The measuring procedure for determining all signals over the entire measured width of a height profile is executed as follows given this sequential measuring method. Fundamentally, at most one transducer transmits at a given time, for example as first transducer USW1 with a signal to be described in greater detail later. The reflections of the ultrasound waves are received by all three transducers USW1, USW2 and USW3, so that information about the acoustic paths from the first transducer USW1 via the reflecting measuring area back to the first transducer USW1 itself and to the other transducers USW2 and USW3 are present. After the maximally possible acoustic running time, the second transducer USW2 can now transmit in the same way and, subsequently, the third transducer USW3. The time required for a complete measuring event is thus mainly determined from the maximum acoustic running times and the length of the transmission signals.

Due to the chronological sequence, from which transducer a received ultrasound signal derives can always be unambiguously determined in this measuring method. The transmission signals need not be encoded but can be fundamentally freely selected. In order to obtain the short reception pulse as desired, the excitation of the transducer must utilize the entire transmission bandwidth thereof insofar as possible. This occurs most simply on the basis of a short pulse excitation, for example with a sine oscillation at the resonant frequency.

FIG. 6 shows the transmission link of the system.

In the transmission branch, the electrical excitation signal $f_s(t)$ passes through the transmission components of the transmission amplifier and the ultrasound transducer established by its pulse responses. The generated ultrasound signal is influenced by the transmission functions of the propagation medium $m(t)$ and of the reflector $r(t)$. In the reception branch, the ultrasound signal is in turn converted into an electrical signal and amplified.

The reception signal $f_e(t)$ can be calculated by convolution of the pulse responses of the individual transmission components:

$$f_e(t)=f_s(t)*h_s(t)*t_s(t)*m(t)*r(t)*_e t(t)* h_e(t)$$

whereby:

$f_e(t)$=reception signal $f_s(t)$=excitation signal $h_s(t)$=transmission function of the transmission amplifier $t_s(t)$=transmission function of the transmission transducer $m(t)$=transmission function of the propagation medium $r(t)$=transmission function of the reflector $t_e(t)$=transmission function of the reception transducer $h_e(t)$=transmission function of the reception amplifier When some components are combined, the following, simplified calculation derives:

$$f_e(t)=f_s(t)*h(t)*r(t), \text{ with } h(t)=h_s(t)*t_s(t)* m(t)*t_e(t)*h_e(t)$$

The transmission behavior in the frequency domain can be calculated by multiplication of the transmission functions:

$$F_e(\omega)=F_s(\omega) \cdot H(\omega) \cdot R(\omega)$$

with $F_s(\omega)$ spectrum of the transmission signal $F_e(\omega)$: spectrum of the reception signal $H(\omega)$: transmission function of the link $R(\omega)$: transmission function of the reflector In general, the transmission behavior of the link leads to a spreading of the short transmission pulse, so that the chronological resolution of the reception signal is deteriorated. The filter property of the transmission link can be compensated to a limited extent by inverse an excitation. A sine oscillation as excitation function shall be assumed below. The signal shape is modified by the transmission link. This reception signal must still be pre-processed or demodulated before the actual evaluation for determining the height profile. For that purpose, the signal is first rectified and subsequently low-pass filtered, i.e. a type of amplitude demodulation is implemented, and the envelope of the signal is obtained. The procedure is symbolically shown in FIG. 7 for a transmitter and a receiver.

A pulse having a length of approximately 50 μs is obtained in this way given the described exemplary embodiment system, this corresponding to an acoustic path of approximately 17 mm.

A reference measurement must be implemented before a measurement can occur with the sequential measuring method. For that purpose, a complete measuring event is executed without the article, lying in the measuring area, i.e. all relevant ultrasound signals are reflected from the background. The reference acoustic running times and the reference amplitude values for all acoustic paths are identified with this measurement. The transit time difference and the amplitude difference can be calculated by comparison to these values.

Filter Analysis

For applications having a high demand made of the measuring rate, there is not sufficient time to allow each transducer to individually transmit in succession. A plurality of transducers should therefore be simultaneously excited. In order to be able to in turn separate the individual parts from the reception signal, the transmission signals must be encoded. In the filter analysis, this coding occurs by excitation of the transducers on different frequency bands. The parts can be reacquired at the receiver by filtering out the corresponding spectral parts out.

The ultrasound transducers employed by way of example here have a useable bandwidth of approximately 35 kHz through 75 kHz. In order to be able to separate the frequency bands with filters that can be easily realized, a gap having a width of approximately 10 kHz should be left between the useful bands. Due to the relatively narrow overall bandwidth, a separation into only two ranges comes into consideration, so that a frequency band of approximately 15 kHz is available per channel.

The principle can be explained with reference to FIG. 8. Since two frequency bands are available for encoding, two transmitters or transmitter groups S1 and S2 can transmit simultaneously. An aggregate signal of both parts is reflected, for example, to the receiver E1. The reception signal is conducted once over a low-pass and once over a high-pass. The low-pass only allows the low-frequency signal part that derives from transmitter or transmitter group S1 to pass; the high-pass only allows the high-frequency signal part that derives from transmitter or transmitter group S2 to pass. Only the envelopes of the two signal parts are formed, so that two short pulses are obtained as result signals. Exactly in the sequential method, information about the acoustic paths can then be acquired from their position and amplitude, with the difference that two transmitters or transmitter groups can now simultaneously transmit.

Of course, this method is more likely to be employed for an arrangement having an even-numbered plurality of transducers. Given a structure having four ultrasound transducers, respectively two transducers can thus transmit in alternating fashion.

In this method, too, a type of pulse excitation is utilized for the transducer drive. This is again based, for example, on a sine oscillation whose frequency lies in the desired band. This signal is also additionally band-pass filtered. Given the tests implemented here, a sine oscillation with the frequency 47 kHz for the lower frequency band was filtered with a Tschebyscheff band-pass of the sixth order of 35 kHz through 50 kHz. A 63 kHz sine oscillation was filtered from 60 kHz through 75 kHz for the higher-frequency band.

In order to separate the parts of the two frequency bands from a reception signal, the reception signal must be correspondingly filtered. Since the signal in the illustrated case is composed of only two discrete bands, one high-pass and one low-pass whose limit frequencies lie in the unused region between the two frequency bands, suffice per receiver. Given this structure, the filters can be realized in terms of software. For example, Tschebyscheff filters of the sixth order with the limit frequency of 55 kHz can be employed both for the high-pass as well as for the low-pass.

After the formation of the envelope, a pulse-shaped signal is obtained for each acoustic path, as desired. Since only just half the bandwidth is available per channel in this method, the same pulse width cannot be achieved as given the sequential method. The chronological width of the pulse, at approximately 110 µs, is thus more than twice as great and, correspondingly, the chronological/topical resolution is poorer over a factor of 2. A channel separation of at least 20 dB is achieved by the filtering.

As in the sequential method as well, a reference measurement without the object must be undertaken in order to be able to determine the reference running time and in order to have a norm for the amplitude values when the ultrasound signals are reflected at the background.

Correlation Analysis

In the filter analysis, the useable bandwidth of the ultrasound transducer is divided into two ranges. In order to assure an adequate channel separation, a frequency range between the bands must remain unutilized because of the filter steepness that is not of an unlimited size. A correlation method shall be presented below that allows the bandwidth to be subdivided without unused regions having to lie therebetween for separation. The transmission signals can therefore be encoded onto three different frequency bands, this making it possible, for example, to allow three transducers to transmit simultaneously. The separation of the parts from the reception signal then occurs by forming the cross-correlation function with the corresponding reference signal.

The cross-correlation function (KKF) $k_{xy}(t_1, t_2)$ of two signals is the averaged product of the amplitude values of the signal $x(t_1)$ at time $t_1$ and of the signal $y(t_2)$ at time $t_2$. When x and y are stationary processes, then $k_{xy}(t_1, t_2)$ is only dependent on the time different $\tau = t_2 - t_1$.

$$k_{xy}(\tau) = \overline{x(t)^* \cdot y(t+\tau)} = \lim_{T \to \infty} \frac{1}{2 \cdot T} \int_{-T}^{T} x(t)^* \cdot y(t+\tau) dt$$

(* = conjugated complex).

Expressed graphically, the KKF indicates the similarity of two signals x and y dependent on their time shift τ. When two processes are independent of one another, then their KKF is identically zero. This applies, for example, to two separate noise processors. By contrast thereto, the KKF assumes its maximum value when the two signals are identical except for a constant factor.. When these two signals are not time-shifted, then the maximum of the KKF occurs at the location τ=0; otherwise, a shift of the maximum occurs by the same time by which the two signals are also shifted relative to one another. The correlation of two identical processes that are not time-shifted is referred to as auto-correlation function (AKF).

The KKF can also be calculated via the cross-power density spectrum in the frequency range. This is particularly important for the numerical calculation of the correlation since the KKF can be calculated significantly faster over the frequency domain than in the time domain. To that end, the two signals to be correlated and the KKF can be transformed into the frequency domain and back with fast-Fourier transformation.

The correspondences between the time signals and their spectra are represented as follows:

$x(t)$ ○—● $X(j\omega)$ $y(t)$ ○—● $Y(j\omega)$ $k_{xy}(\tau)$ ○—● $S_{xy}(j\omega)$ whereby $S_{xy}(j\omega)$ is referred to as cross-power density spectrum. The cross-power density spectrum can be calculated from the spectra of the output signals $X(j\omega)$ and $Y(j\omega)$ by multiplication:

$$S_{xy}(j\omega) = \lim_{T \to \infty} \frac{1}{2T} \cdot X(j\omega) \cdot Y^*(j\omega)$$

The KKF is obtained by back-transformation of the cross-power density spectrum into the time domain.

In the correlation measuring method, the cross-correlation is used for extracting the sought signal parts from the mixed reception signal. For that purpose, the transmission signals must be encoded, as was already the case in the filter analysis. The encoding again occurs, on the one hand, by division into different frequency bands. These can thereby directly adjoin one another, so that the entire bandwidth of the ultrasound transducer can be utilized. Since it is not frequencies that are measured as a result of the cross-correlation but similarities that are sought to a reference signal, the excitation signal must be chronologically expanded. Only in this way is an adequately clear and short, pulse-shaped maximum achieved in the cross-correlation function. What are referred to as chirps are therefore employed as transmission signals. These are sequences of sine oscillations whose frequency is varied with the time. Given this form of excitation, moreover, significantly more energy is transmitted due to the longer duration than is transmitted given pulse excitation. As a result thereof, the signal-to-noise ratio is also improved; this, however, is of no concern here since it also lies below the achieved channel separation of 20 dB given the other evaluation methods for reception signals.

The signal curve of a chirp can be calculated with the following equation:

$$s(t) = S_0 \left( \sin\left( 2\pi \cdot \left( f_0 - \frac{\Delta f}{2} \right) \cdot t + \frac{\Delta f}{2 \cdot T} \cdot t^2 \right) \right)$$

whereby $f_0$ is the center frequency, $\Delta f$ is the bandwidth and T is the duration of the chirp.

Chirps having center frequencies of 42 kHz, 53 kHz and 64 kHz and a bandwidth of 15 kHz are employed as excitation signals. The auto-correlation function has the same curve for all three chirps. It exhibits a clear maximum at the location t=0 whose amplitude lies more than 20 dB above that of the subsidiary maximums. The amplitude values of the cross-correlations between the three signals likewise lie at least twenty dB under the maximum value of the auto-correlation. When, thus, the signal curve of one of these chirps is present, a finding can be made by correlation with the three reference chirps as to what chirp is involved. When a chirp is correlated with the same but time-offset chirp, then, strictly interpreted, there is no auto-correlation; the signal, however, has the same curve that is also merely shifted by the same time. In order to be able to exactly identify the time offset, the principal maximum of the auto-correlation should be optimally narrow. Similar to the pulse excitation method, this width is dependent on the bandwidth of the signal. It can be fundamentally stated that the bandwidth of the chirp is inversely proportional to the time width of the maximum.

Figure 9:
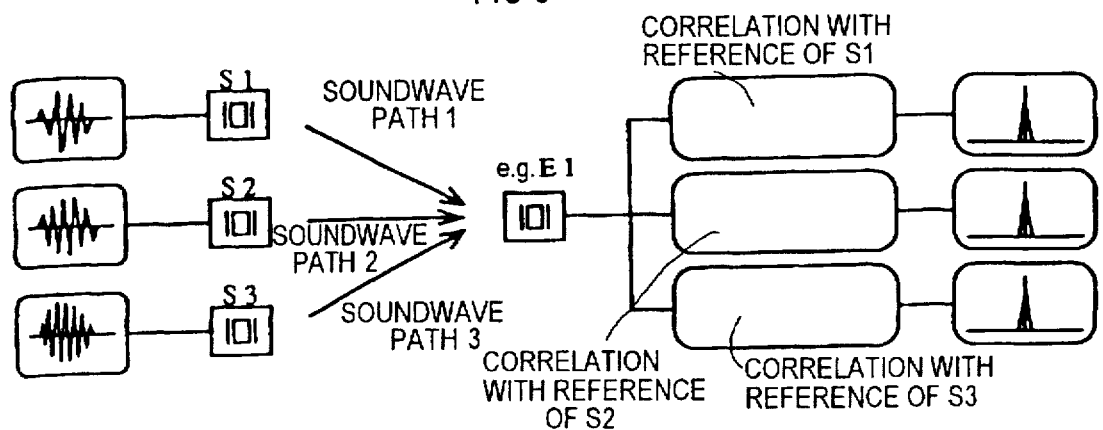
FIG. 9 shows in correlation the transmission, the reception and the processing of an ultrasound signal for a receiver.

FIG. 9 shows the reception and the processing of the signal for a receiver. S1 and E1 are both the same ultrasound transducer that works on the one hand as transmitter and on the other hand as receiver. The three ultrasound transducers USW1, USW2 and USW3 are excited with the chirp identified, for example, by a simulation. In order to be able to implement a measurement, the reference signals must first be identified without the object lying in the measuring region, i.e. all signals are reflected from the background. For this purpose, only the transmitter S1 first transmits the chirp allocated to it. All three transducers USW1, USW2 and USW3 receive the reflected signal. This signal is then separately stored as a reference signal of transmitter S1 for each of the three receivers. This procedure is repeated for the transmitters S2 and S3, so that three reference signals from the three transmitters S1, S2 and S3 are present for each reception branch. Subsequently, a further measurement cycle is implemented during which an object is still not allowed to lie in the measuring area. To that end, all three transmitters isochronically transmit their transmission signal. Each receiver registers an aggregate signal from the reflections of the three ultrasound signals. As may be seen for the receiver E1 in FIG. 9, this aggregate signal is cross-correlated with the previously stored references. By correlation with the part that corresponds to the reference, a maximum arises in the KKF. The other signal parts are suppressed by at least 20 dB. Since all signals were now reflected from the background, the maximum lies exactly at the location t=0. The amplitude of the maximum serves as norm for the future measurements. After the execution of these events, one can begin with the actual measurements for object recognition. The execution is fundamentally the same as in the reference measurement, i.e. all transducers also transmit simultaneously now. The reflection of the signals, however, can now occur not only at the background but also at the object, so that parts of the signals return earlier to the transducers;. This is reflected in the results of the correlations by shifting of the maximums by the corresponding time. The information about the object are acquired from the shift of the maximums and the amplitudes.

Evaluation

The evaluation method shall be described below, i.e. how the information that are present for the acoustic path between the individual transducers are to be combined and how the actual measured result, namely the position of the object Obj on the conveyor belt FB, is to be identified therefrom.

The evaluation method can be essentially divided into three parts. First, the information required for further evaluation such as the running time and the amplitudes of the ultrasound signals for the individual acoustic paths must be determined from the results of the excitation method. In the second step, the height profile of the object Obj transversely to the conveying direction is identified from these data. This evaluation is partly undertaken with the assistance of a fuzzy logic. The last step is the identification of the position of the object in conveying direction.

Pre-processing of the Reception Signals

Figure 10A:
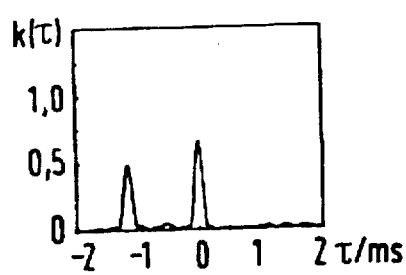
FIGS. 10a and 10b illustrates the result functions.
Figure 10B:
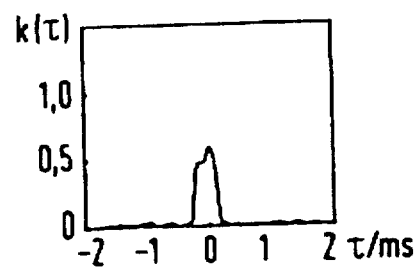

A signal curve that comprises a short pulse at specific points in time that reflect the acoustic running times for the corresponding paths is present for each acoustic path. The maximum running times are determined by reference measurements that differ dependent on method. These are present when the ultrasound wave is reflected at the background. The time axes of the signals are scaled with these points in time as zero points (reference points). The signal curves of the results of the individual measuring procedures thus still differ only on the basis of the different width of the pulses. Since the running time differences required for the determination of the object height are defined from the positions of the pulses, the possible chronological resolution is determined from the width and the shape of the pulses. In the correlation analysis, the width lies at approximately 125 µs, this corresponding to a path of 43 mm. Fundamentally, the running times can be determined with a precision of at least±20 µs via a method that seeks the local maximums of a function. This corresponds to an acoustic path resolution of±7 mm. Result functions can look like what is shown in FIGS. 10a and 10b. It may be clearly seen that two pulses overlap. In order to assure a good quality of the evaluation, great significance is recorded to the method for extracting the features of amplitude and position from the reception signals.

As was already the case in the measuring method, the signal processing is digitally undertaken. In the first step, a smoothing of the noise-infested function curve is implemented. For that purpose, a linear average is calculated for each point from a specific plurality of neighboring points identified by trials:

$$\overline{a_n} = \frac{a_{n-N} \ldots + a_{n-1} + a_n + a_{n+1} \ldots + a_{n+N}}{2N+1},$$

whereby $a_n$ is the value of the sample signal at the location n and N+1 is the plurality of sampling points.

The actual determination of the maximums is not undertaken in a direct way from the time signal; rather, the derivation of the function is calculated first. This is identified here via the difference quotients according to the equation $$a'_n = \frac{a_{n-N} - a_{n+N}}{2N} .$$

Due to the calculation of the derivation, the position of a maximum can be limited since the derivation comprises a pronounced local maximum at the leading edge thereof and comprises a minimum at the trailing edge. The extremes can still be evaluated even given two pulses merging into one another.

Local maximums and the minimums following thereupon are respectively sought in pairs. The two pairs having the greatest amplitude differences are then selected. A pulse can then be determined in the time function respectively between the positions of a maximum and a minimum of the derivation. For that purpose, a local maximum is sought in the time function between these points. When one is found, position and amplitude value thereof are fixed. When no local maximum is present—as for the left-hand pulse of the pulses running into one another in the above example—, then the amplitude value and the position exactly in the middle of the maximum/minimum pair of the derivation is considered to be the result.

Of course, the amplitude values that are greater than a defined limit values (for example, greater than the channel separation) are viewed as a valid result. In this way, one obtains the position and the amplitude of one or two maximums of the signal curve for each acoustic path. The height profile of the measured stripe under the sensors is determined from these values in the following evaluation.

Determination of the Height Profile

It is assumed for the determination of the height profile that the object has a rectangular cross section. As a result thereof, the problem is reduced to the determination of the height and of the left-hand and right-hand edge of the object cross section. The determination of the height occurs from the running time difference of reflection at the background and at the object.

When an object lies in the measuring area, one part of the ultrasound signals is not reflected at the background, but from the object. As a result thereof, one or more pulses in the reception functions are shifted, since the running time of these signals is shorter.

The chronological shift $\Delta t$ of the pulse compared to the reference position is determined in the signal preprocessing. With the known velocity of sound in air c, the height h of the object can be calculated therefrom $$h = \frac{c \cdot \Delta t}{2} .$$

Viewed strictly, this equation is only valid for the acoustic paths perpendicular to the background. Due to the different emission angle, an error that also becomes greater with greater object height occurs given the acoustic paths between neighboring transducers. If possible, the signals of the perpendicular acoustic paths, i.e. the acoustic paths wherein the same transducer serves as transmitter and receiver, should be evaluated for the height determination. When these signals do not comprise a transit time shift, the signals of the acoustic paths that proceed non-perpendicularly between neighboring transducers must be utilized. The following equation for calculating the height then derives from the geometrical relationships:

$$h = h_0 - \frac{1}{2} \sqrt{(c \cdot \Delta t)^2 - d_0^2} ,$$

whereby $h_0$ is the height of the transducers above the base surface, the background, and $d_0$ is the spacing of neighboring transducers.

The equation $$h = \frac{c \cdot \Delta t}{2}$$

is usually adequate since the occurring error is relatively slight. For example, the occurring error given the arrangement employed here (transducer height 80 cm, transducer spacing 26 cm), maximally permitted object height 40 cm) is a maximum of 1.3 cm. This error is slight compared to the achieved, lateral resolution of this measuring system.

Determination of the Edge Positions

The resolution of ultrasound systems in the lateral direction is not nearly as good as the axial resolution. It is therefore advantageous to work with fuzzy logic here.

It is fundamentally possible to acquire lateral instructions only with one multi-transducer system or one moving transducer. The reception signals of all transducers are therefore utilized here. The operation of these data and the determination of the results therefrom occurs with fuzzy logic.

As already explained, the amplitudes and the running times of the ultrasound signals for the individual acoustic paths are calculated in the signal preprocessing. The exact running times are used only for the height calculation. For the edge determination, by contrast, the amplitudes of the maximums in the reception signal are utilized. Moreover, whether a maximum derives from a reflection at the object, i.e. is chronologically shifted relative to the reference, or whether it comes from a reflection at the background must be known.

Figure 11A:
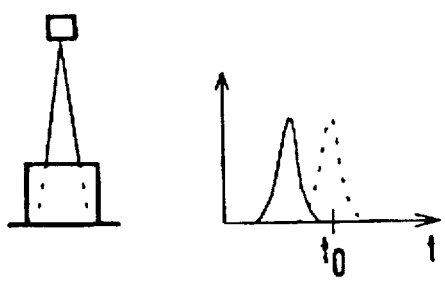
FIGS. 11a and 11b show two possible reflections and the result functions belonging thereto.
Figure 11B:
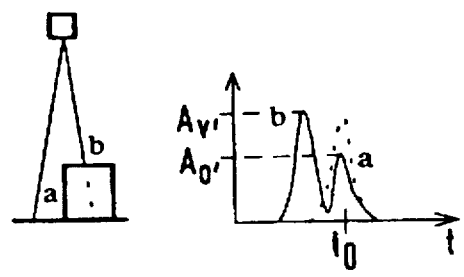

In order to make the principle of the evaluation clear, FIGS. 11a and 11b show the possible curves of the reception signals and the measuring situation appertaining thereto. The examples reproduce the situation of the vertical acoustic paths. That stated below, however, also approximately applies for the acoustic paths between neighboring transducers. In the previous presentations, the acoustic paths were shown as lines and the reflection occurred according to the law of reflection incident angle=angle of reflection. In fact, however, the acoustic waves are reflected back to the receiver in a broader region around the illustrated center line.

FIGS. 11a and 11b show two possibilities of the reflection. The broken lines indicate the situation given reflection at the background. The ultrasound signal is completely reflected from the base surface and the reception signal thus corresponds to that of the reference measurement, i.e. the position of the maximum lies at t=0 and the normed amplitude is equal to 1. The situation is similar when the ultrasound wave is completely reflected from the object Obj. In this case, the maximum in the reception signal is shifted by the corresponding running time. The amplitude can assume different values dependent on the material, height and surface curvature of the object Obj. When an edge of the object Obj lies in the reflection region, a part of the ultrasound signal is reflected at the background, another part at the object Obj and two maximums occur in the reception signal. The exact position of the edge can be identified from their amplitude values and their relationship to one another.

Following the explanation of the principle, the evaluation method shall be described in greater detail on the basis of a specific example. FIG. 12 shows a measuring situation wherein all of the above-described reflection possibilities occur. FIGS. 12b–f show the signal curves required for the evaluation that are calculated with the correlation method. Only the signals of five of the nine possible acoustic paths are employed since the other signals only contain redundant information. The position of the edges can then be determined in the following way from the amplitude values of the maximums of these signal curves. The signal curve ① comprises two maximums, i.e. an edge of the object Obj must lie in the region under transducer USW1. The result for acoustic path ② shows only one reflection from the object Obj. It can be concluded therefrom that the left-hand edge of the article must lie under transducer USW1. The exact position can be determined from the amplitudes of the two maximums of signal curve ①. The amplitude of the maximum deriving from the object reflection should play a subordinate part in the position calculation since it is highly dependent on the material, on the surface curvature and on the height of the object. By contrast, the height of the maximum of the reflection at the background has greater predicative force. As already mentioned, it is not only a line-shaped acoustic beam that is reflected back to the receiver; rather, a relatively broad region around the center line contributes to the reflection. Given the dimensions of the arrangement present here, this region has a width of approximately±5 cm. When no object lies in this region, then the normed amplitude of the maximum is approximately 1. When, by contrast, the object lies in this section, then the amplitude is correspondingly lower or it is equal to 0 when the article completely covers the region. A monotonous curve can be approximated between the extreme values of the amplitude dependent on which part of the acoustic beam is reflected from the background. After the position of the left-hand edge has been found in the region of acoustic path ①, the further signal curves are viewed in order to identify the position of the right-hand edge. The curves for the acoustic paths ② and ③ exhibit complete reflection at the article; the edge must therefore lie to the right thereof. In acoustic paths ④ and ⑤, by contrast, the reflection occurs only at the background. The range of coverage of an acoustic path amounts to approximately±4 cm at the background. The conclusion can thus be drawn from the signal curves ③ and ④ that the right-hand edge must be located at least 4 cm to the right of the center line of acoustic path ③ and at least 4 cm to the left of the center line of acoustic path ④. When the spacing of the center lines is greater than 8 cm, the position of the edge can consequently no longer be exactly identified; rather, only the region can be recited.

The above-described signal evaluation can be realized in various ways. Fundamentally, a method based on conventional logic together with rules for calculating the exact edge positions from the amplitude values can be produced.

A coverage degree $V_1$ can be identified from the amplitude of the reference measurement without object and the amplitude of the following measurement with object:

$$V_1 = \frac{A_{Oref} - A_O}{A_{Oref}} = 1 - A_0$$

whereby:

$V_1$=coverage degree $A_{Oref}$=amplitude of the maximum of the echo signal in the reference measurement (only echo from background)

$A_O$=amplitude of the maximum of the echo signal from the background given the measurement with object $$A_0 = \frac{A_O}{A_{Oref}}$$

whereby $A_0$ is the normed background echo amplitude. The coverage degree is a criterion for the coverage of the background, of the conveyor belt, by the object. The object covers the background to a greater and greater extent the greater the degree of coverage.

A second coverage degree $V_2$ can be determined from the amplitudes of the maximums occurring in the received echo. For that purpose, the amplitude $A_v$ is placed into relationship with the amplitude $A_O$ (see FIG. 11b):

$$V_2 = \frac{A_v'}{A_O + A_v'} = \frac{A_v}{A_0 + A_v}$$

$$A_0 = \frac{A_O}{A_{Oref}}$$

$$A_v = \frac{A_v'}{A_{Oref}}$$

whereby:

$V_2$=second coverage degree $A_v$=amplitude of the maximum of the echo signal in the measurement with object preceding $t_0$ $A_O$=amplitude of the maximum of the echo signal given the measurement with object at $t_0$.

The two coverage degrees $V_1$ and $V_2$ can be operated with one another to form a third coverage degree $V_3$:

$$V_3 = \alpha \cdot V_1 + \beta \cdot V_2$$

whereby:

$\alpha$=first weighting factor $\beta$=second weighting factor.

Given a smooth background that reflects uniformly well and given objects with an unspecified surface geometry, the first weighting factor $\alpha$ should be selected greater than the second weighting factor $\beta$ since, by contrast to the reflectivity of the object, the reflectivity of the background is known from the reference measurement and the coverage degree V1 therefore supplies the more reliable value for this reason. In addition to being dependant on the reflectivity of the background, the size of the weighting factors is also dependent on the shape of the objects to be detected and on the structure of the measuring arrangement. When, for example, cuboid, highly reflective objects on a planar conveyor belt are to be detected with the present system, the $\alpha$ and $\beta$ are preferably selected as 0.5.

A further possibility of operating the coverage degrees $V_1$ and $V_2$ can ensue in that the respectively greater of the two coverage degrees supplies the resultant coverage degree $V_4$:

$$V_4 = \text{Max } (V_1, V_2)$$

Particularly given objects with an undetermined surface geometry, the coverage degree $V_4$ represents a beneficial operation.

The coverage degree is separately determined for each echo signal that is received. The edges of the object can be concluded from the comparison of the values of the coverage degrees. When, for example, the coverage degree determined at the transducer USW1 is smaller than that determined at the transducer USW2, then a left-hand object edge is present, see FIG. 12. When the coverage degree determined at the transducer USW2 is greater than that determined at the transducer USW3, then a right-hand object edge is present.

A realization with fuzzy logic can be simply adapted to various situations. Compared to direct arithmetic operation, the advantage here is comprised therein that the input quantities, $a_0$ and $a_v$, can be very flexibly operated with one another by a fuzzy control unit and dependent on the situation, so that non-linear relationships can also be described relatively simply. Moreover, fuzzy methods are usually more tolerant to errors, i.e. occurring disturbances as could be produced here, for example, by air flows are more correctly evaluated.

Figure 13A:
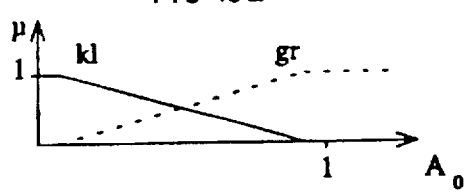
FIGS. 13a and b show the affiliation functions for a fuzzy evaluation.
Figure 13B:
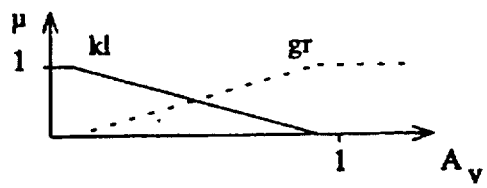

The first step in the production of a fuzzy application is the determination of the required input and output variables as well as the affiliation functions for fuzzification and defuzzification. The amplitudes of the reflection maximums of the five relevant acoustic paths are employed as input variables. The normed amplitude of the maximum of the background reflection is called $a_0$ and the normed amplitude of the shifted maximum is called $A_v$. The position of the edge is approximately linearly dependent on the amplitude $A_0$. In order to have this dependency enter into the result by the fuzzy inference, the variable must either be classified into a relatively great number of affiliation classes or into only two with a corresponding, linear transition. Since many classes lead to a high number of rules, the second possibility has been selected. FIG. 13 shows the selected affiliation functions $\mu(A_0)$ and $\mu(A_v)$ that classifies the values into the classes little (kl) and big (gr).

The linear transition begins at an amplitude of 0.1, and ends at 0.9 in order to avoid the influence of amplitude fluctuations due to disturbances. In order to be able to recognize the acoustic path to which the respective variable belongs, the number is indicated in parentheses. The following ten values are thus forwarded to the fuzzy evaluation as input variables:

$A_o(①), A_v(①), A_o(②), A_v(②), A_o(③), A_v(③), A_o(④), A_v(④), A_o(⑤), A_v(⑤)$.

The positions of the left-hand and of the right-hand edges are employed as output variables. The division into classes must be adapted to the dimensions of the measuring system. Here, the transducers are located at the coordinates –26 cm, 0 cm and +26 cm over the cover able measuring stripe having an expanse of –30 cm through +30 cm. The width of the measuring stripe is divided into six affiliation classes that are referenced with the following, linguistic variable names: far left (gl), left (li), half left (hl), half right (hr), right (re), far right (gr).

The intersections of the affiliation functions thereby respectively lie at the reflection points of the acoustic paths.

The fuzzy inference that operates the output with the input variables is described by a plurality of rules. To that end, the above-described procedure for determining the edge positions is converted into when/then rules. Due to the low number of classes in the input variables, the rule set takes on a very surveyable form.

| Rules Left Edge: | | | |
|---|---|---|---|
| Rule 1: | | | |
| aWHEN | $A_o$ ① little | OR | $A_v$ ① big |
| THEN | left edge far left (gl) | | |
| Rule 2: | | | |
| WHEN | {($A_o$ ① big | AND | $A_v$ ① little) |
| OR | $A_o$ ① big} | | |
| AND | ($A_o$ ② little | OR | $A_v$ ② big) |
| THEN | left edge left (li) | | |
| Rule 3: | | | |
| WHEN | {($A_o$ ② big | AND | $A_v$ ② little) |
| OR | $A_o$ ② big} | | |
| AND | ($A_o$ ③ little | OR | $A_v$ ③ big) |
| THEN | left edge half left (hl) | | |
| Rule 4: | | | |
| WHEN | {($A_o$ ③ big | AND | $A_v$ ③ little |
| OR | $A_o$ ③ big | | |
| AND | ($A_o$ ④ little | OR | $A_v$ ④ big |
| THEN | left edge half right (hr) | | |
| Rule 5: | | | |
| WHEN | {($A_o$ ④ big | AND | $A_v$ ④ little) |
| OR | $A_o$ ④ big} | | |
| AND | ($A_o$ ⑤ little | OR | $A_v$ ⑤ big) |
| THEN | left edge right (re) | | |
| Rules Right Edge: | | | |
| Rule 6: | | | |
| WHEN | $A_o$ ⑤ little | OR | $A_v$ ⑤ big |
| THEN | right edge | far right (gr) | |
| Rule 7: | | | |
| WHEN | {($A_o$ ⑤ big | AND | $A_v$ ⑤ little |
| OR | $A_o$ ⑤ big} | | |
| AND | ($A_o$ ④ little | OR | $A_v$ ④ big) |
| THEN | right edge | right (re) | |
| Rule 8: | | | |
| WHEN | {($A_o$ ④ big | AND | $A_v$ ④ little) |
| OR | $A_o$ ④ big} | | |
| AND | ($A_o$ ③ little | OR | $A_v$ ③ big) |
| THEN | right edge | half right (hr) | |
| Rule 9: | | | |
| WHEN | {($A_o$ ③ big | AND | $A_v$ ③ little |
| OR | $A_o$ ③ big} | | |
| AND | ($A_o$ ② little | OR | $A_v$ ② big) |
| THEN | right edge | half left (hl) | |
| Rule 10: | | | |
| WHEN | {($A_o$ ② big | AND | $A_v$ ② little) |

| | | | |
|---|---|---|---|
| OR | $A_o$ ② big} | | |
| AND | ($A_o$ ① little | OR | $A_v$ ① big) |
| THEN | right edge | | left (li) |

The functioning of the fuzzy processing shall be described on the basis of the above-presented exemplary situation. In this case, only the reflections of the acoustic paths ① and ② are relevant for the detection of the left edge of the object Obj.

The pre-processing of the signals in the example supplies the normed amplitude values:

$$A_o(①)=0.74; A_v(①)=0.58; A_o(②)=0.08; A_v(②)=1.42;$$

These values and those of the other acoustic paths are forwarded to the fuzzy logic as input variables. In the first step, the fuzzification of the variables is implemented, i.e. the values are assigned to the classes "little" and "big" according to the described affiliation functions.

Figure 14:
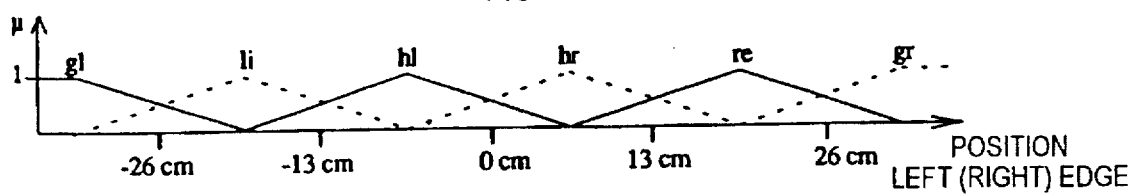
FIG. 14 illustrates a further affiliation function for the fuzzy evaluation.
Figure 15A:
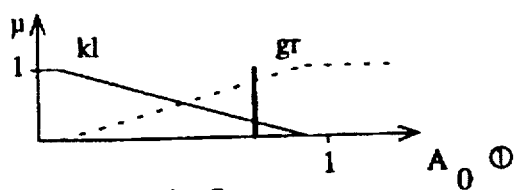
FIGS. 15a–15d show additional affiliation functions for the fuzzy evaluation.
Figure 15B:
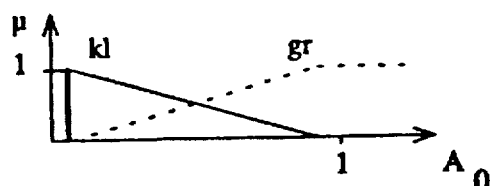
Figure 15C:
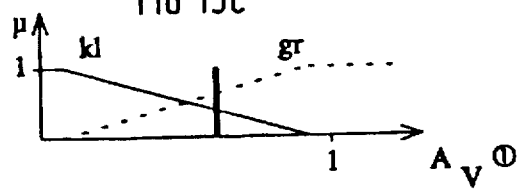
Figure 15D:
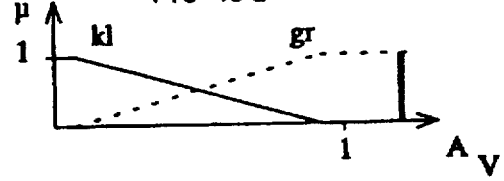

The affiliations μ of the variables can be taken or, respectively, calculated from FIGS. 13 and 14. For example, the value of the variable $A_o(①)$ at 80% belongs to the class "big" and, at 20% belongs to the class "little". The affiliations of the remaining variables are listed below, see FIGS. 15a–d:

| | |
|---|---|
| μ big ($A_o$ (①)) = 0.8; | μ little ($A_o$ (①)) = 0.2: |
| μ big ($A_v$ (①)) = 0.6; | μ little ($A_v$ (①)) = 0.4: |
| μ big ($A_o$ (②)) = 0.0; | μ little ($A_o$ (②)) = 1.0: |
| μ big ($A_v$ (②)) = 1.0; | μ little ($A_v$ (②)) = 0.0: |

After the fuzzification of the variables, the inference can be formed according to the afore-mentioned rules. In the present case, only the rules 1 and 2 forward the determination of the left edge supply affiliations unequal to zero. The AND and OR operations are realized with the minimum or, respectively, maximum method given the fuzzy algorithms employed.

Rule 1 supplies an affiliation value to the result class far left (gl):

WHEN $A_o$ ① little  OR  $A_v$ ① big

THEN left edge    far left (gl)

μ gl max (μ little ($A_o$ (①)), μ big ($A_v$ ((1))) = max (0.2, 0.6) = 0.6

An affiliation to the class left (li) is determined with Rule 2:

WHEN {($A_o$ ① big    AND $A_v$ ① little)

OR    $A_o$ ① big}

AND    ($A_o$ ② little

OR    $A_v$ ② big)

THEN left edge left (li)

μ li=min (max(min(μ big ($A_o$ (①)), μ little ($A_v$(①))), μ big ($A_o$(①))))

(max (μ little ($A_o$ (②)), μ big ($A_v$ (μ)))))) =

= min (max (min (0.8, 0.4), 0.8), max (1.0, 1.0))
= 0.8

Figure 16:
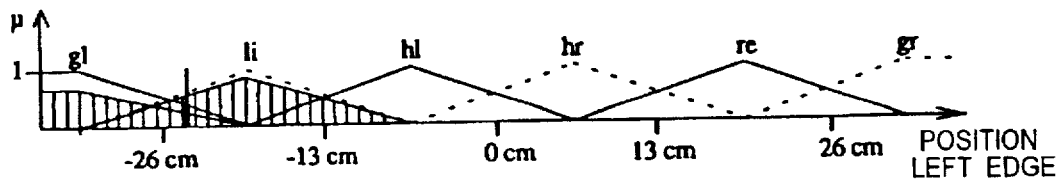
FIG. 16 shows the result of the fuzzy inference.

Since all other rules supply the value 0, the vertically shaded regions that represent the affiliations to the classes far left and left derive as result of the fuzzy inference. In order to obtain a specific coordinate for the position of the left edge from the unsharp values, the result is defuzzified. This occurs by calculation of the area center of gravity of the shaded regions. The horizontal coordinate of this point is the result of the fuzzy evaluation, i.e. the position of the left object edge. In this case, it has the value −25 cm, shown by a vertical line in FIG. 16.

The inference for determining the right edge occurs in the same way, merely that Rules 6–10 are now applied. The above-recited rules work most precisely for low, cuboid objects having a smooth surface. For higher articles, deviations can occur since the non-perpendicularly proceeding acoustic paths supply different reflections given higher articles. This can be alleviated in that two or more rule sets adapted to different heights are applied, the results thereof being averaged with different weighting corresponding to the height of the article.

Low-shaped articles or objects having an arched surface must also be recognized well in the evaluation, even though the reflection signals of these articles can have extremely different amplitudes. For example, the acoustic waves given reflection at a concave surface are concentrated toward the receiver, similar to the case of a parabolic microphone, whereas a reflection at a convex article produces only an extremely small reception signal. For this reason, as already mentioned, it is mainly the amplitudes of the background reflections that are evaluated since the reflection properties of the background always remain the same. For articles having a non-rectangular cross section, thus, the left and right edge are determined. As a result, one obtains a height profile proceeding at a right angle regardless of how the article is shaped.

The afore-mentioned rule sets only supply correct results when a reflection at the object ensues at at least two acoustic paths. Given extremely narrow articles, however, it can occur that these are covered by only one acoustic path. The height can in fact be calculated from the signal curve but nothing can be stated about the position of the edges. When only one reflection occurs at the object and none at the background, it can be assumed that the article lies centered relative to the center line of the acoustic path and that the width does not exceed a maximum value. When, by contrast, one obtains two maximums in the signal of the acoustic path, i.e. partial reflection at the object and at the background, then no statement can be made as to whether the article lies more toward the right or more toward the left. For this reason, a separate rule set is employed for this case wherein only one acoustic path comprises an object reflection. The edge positions are determined as though the article lay centered relative to the acoustic path and as though a width had a specific, average value. When the precision of this approximation is not adequate, then the ultrasound transducers must be arranged at smaller intervals, so that narrow articles are also covered by at least two acoustic paths.

Given the experimental arrangement realized here (transducer height 80 cm, transducer spacing 26 cm, maximally allowed object height 40 cm), a precision of 5 cm is achieved in the determination of the edge positions. The maximum error usually occurs when one edge lies in the above-described, unsharp region between two acoustic path center lines or when the case cited in the preceding paragraph occurs that only one acoustic path comprises an object reflection. The precision can still be improved in that the transducers are arranged closer together. The system then becomes more complicated since more transducers are required for the acquisition of a specific width.

Determination of the Length

A two-dimensional image, i.e. the above-described height profile, is acquired in a measuring cycle with the described measuring system in a plane onto the transducers transversely relative to the moving direction of the conveyor belt. The expanse of the article in conveying direction, by contrast, cannot be identified in one cycle; rather, the integration of a plurality of height profiles is necessary. The measuring procedure for determining the length of an object moving on the conveyor belt then occurs in the following way. A measuring cycle is implemented at regular intervals and the height profile of the region that is located under the transducers at these points in time (or, to be more precise, time spans since a measuring cycle lasts a finite time) is determined. When, for example, a measuring cycle can be implemented in 50 ms and the conveyor belt moves at 1 m/s, then a height profile can be acquired at intervals of 5 cm. When these height profiles are joined together, then a three-dimensional image of the situation that has moved past under the transducers can be acquired.

The resolution precision in the longitudinal direction is determined from the time that is required for a measuring cycle and from the speed with which the conveyor belt moves. The determination of the height profile given a moving measuring situation functions just as well as in the case of static measurements.

Although various minor changes and modifications might be proposed by those skilled in the art, it will be understood that our wish is to include within the claims of the patent warranted hereon all such changes and modifications as reasonably come within our contribution to the art.

We claim as our invention:

1. A method for determining a degree of coverage of an object relative to a background with ultrasound, comprising the steps of:

emitting an ultrasound reference signal in a direction of the background where the reference signal is reflected;

storing an amplitude and an occurrence time of a maximum of the reflected reference signal;

emitting an ultrasound measurement signal in the direction of the object and of the background where the measurement signal is reflected;

if a maximum occurs in the reflected measurement signal at said occurrence time of the maximum of the reflected reference signal, storing the amplitude of the maximum of the reflected measurement signal; and determining a first coverage degree from said amplitude of the maximum of the reflected reference signal and said amplitude of the maximum of the reflected measurement signal, said first coverage degree being a measure for the degree of coverage of the background by the object since the coverage of the background becomes greater the smaller is the amplitude of the maximum of the reflected measurement signal compared to the amplitude of the maximum of the reflected reference signal.

2. The method according to claim 1 including the steps of:

storing an amplitude of a second maximum occurring in the reflected measurement signal;

determining a second coverage degree from said amplitude of said second maximum with said amplitude of said reflected measurement signal, said second coverage degree being all the greater the greater is the amplitude of the second maximum compared to the amplitude of the maximum of the reflected measurement signal;

forming a third coverage degree based on the first and the second coverage degrees dependent on respective weightings; and determining the weightings by object properties.

3. The method according to claim 1 including the steps of:

storing an amplitude of a second maximum appearing in the reflected measurement signal;

determining a second coverage degree from the amplitude of the second maximum and the amplitude of the maximum of the reflected measurement signal, the second coverage degree being all the greater the greater is the amplitude of the second maximum compared to the amplitude of the maximum of the reflected measurement signal; and forming another coverage degree based on the first and second coverage degrees.

4. The method according to claim 1, wherein an edge of the object is considered recognized when the following conditions are met: the amplitude of the maximum of the reflected measurement signal is smaller than the amplitude of the maximum of the reflected reference signal, and wherein the amplitude of the maximum of the reflected measurement signal differs from zero.

5. The method according to claim 1 wherein the ultrasound is emitted line-shaped in the direction of the object and of the background.

6. The method according to claim 1 wherein the reflected ultrasound signal is measured at different measuring locations.

7. The method according to claim 1 wherein a plurality of ultrasound transducers are employed for generating the ultrasound, these being simultaneously driven so that they simultaneously transmit.

8. The method according to claim 7 wherein the ultrasound transducers are excited with differently encoded signals.

9. The method according to claim 7 wherein the ultrasound transducers are excited with different frequencies.

10. The method according to claim 1 wherein the ultrasound transducers employed for generating the ultrasound are sequentially driven so that they sequentially transmit.

11. The method according to claim 1 wherein a relative motion between the object and the ultrasound transducers occurs.

12. The method according to claim 1 wherein the coverage degree is determined with fuzzy logic.

13. The method according to claim 1 wherein the coverage degree of the object is determined in a conveyor system.

14. A method for determining a degree of coverage of an object relative to a background with ultrasound, comprising the steps of:

emitting an ultrasound reference signal in a direction of the background where the reference signal is reflected;

storing an amplitude and an occurrence time of a maximum of the reflected reference signal;

emitting an ultrasound measurement signal in the direction of the object and of the background where the measurement signal is reflected;

if a maximum occurs in the reflected measurement signal at said occurrence time of the maximum of the reflected reference signal, storing the amplitude of the maximum of the reflected measurement signal; and determining a first coverage degree from a comparison of said amplitude of the maximum of the reflected reference signal and said amplitude of the maximum of the reflected measurement signal, said first coverage degree being a measure, for a coverage of the background by the object.

* * * * *